US008639842B1

(12) United States Patent
Bagepalli et al.

(10) Patent No.: US 8,639,842 B1
(45) Date of Patent: Jan. 28, 2014

(54) SCALABLE GATEWAY FOR MULTIPLE DATA STREAMS

(75) Inventors: Nagaraj A. Bagepalli, San Jose, CA (US); Abhijit Patra, San Jose, CA (US); Murali Bashyam, Fremont, CA (US); David Wei-Shen Chang, Milpitas, CA (US); Mahesh Jethanandani, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1591 days.

(21) Appl. No.: 11/479,981

(22) Filed: Jun. 30, 2006

(51) Int. Cl.
*G06F 15/16* (2006.01)
*G06F 15/173* (2006.01)

(52) U.S. Cl.
USPC ........... 709/238; 709/219; 709/217; 709/227; 709/230; 709/231; 709/239; 709/240; 709/242; 709/225; 709/246

(58) Field of Classification Search
USPC .......................................................... 709/217
See application file for complete search history.

(56) References Cited

U.S. PATENT DOCUMENTS

| | | | | |
|---|---|---|---|---|
| 6,772,333 | B1* | 8/2004 | Brendel | 713/153 |
| 7,111,162 | B1* | 9/2006 | Bagepalli et al. | 713/151 |
| 7,873,994 | B1* | 1/2011 | Wu | 726/14 |
| 2002/0010798 | A1* | 1/2002 | Ben-Shaul et al. | 709/247 |
| 2002/0026500 | A1* | 2/2002 | Kanefsky et al. | 709/219 |
| 2002/0073155 | A1* | 6/2002 | Anupam et al. | 709/205 |
| 2002/0159601 | A1* | 10/2002 | Bushmitch et al. | 380/277 |
| 2002/0191548 | A1* | 12/2002 | Ylonen et al. | 370/254 |
| 2003/0005116 | A1* | 1/2003 | Chase et al. | 709/225 |
| 2003/0074388 | A1* | 4/2003 | Pham et al. | 709/106 |
| 2003/0118004 | A1* | 6/2003 | Pan | 370/352 |
| 2003/0200331 | A1* | 10/2003 | Mahajan et al. | 709/238 |
| 2003/0223457 | A1* | 12/2003 | Cyr et al. | 370/474 |
| 2004/0049579 | A1* | 3/2004 | Ims et al. | 709/225 |
| 2004/0049702 | A1* | 3/2004 | Subramaniam et al. | 713/201 |
| 2004/0268147 | A1* | 12/2004 | Wiederin et al. | 713/201 |
| 2005/0010754 | A1* | 1/2005 | Brendel | 713/153 |
| 2005/0038905 | A1* | 2/2005 | Banes et al. | 709/238 |
| 2006/0064478 | A1* | 3/2006 | Sirkin | 709/223 |
| 2006/0095969 | A1* | 5/2006 | Portolani et al. | 726/23 |

(Continued)

OTHER PUBLICATIONS

Nagaraj Bagepalli, et al., pending U.S. Patent Application entitled "Load Balancing Approach for Scaling Secure Sockets Layer Performance," U.S. Appl. No. 09/954,330, filed Sep. 10, 2001, including Specification: pp. 1-26; Claims: pp. 27-35; Abstract: p. 36; Drawings: Figures 1-7 on 10 sheets.

*Primary Examiner* — Rupal Dharia
*Assistant Examiner* — Mohammed Ahmed
(74) *Attorney, Agent, or Firm* — Campbell Stephenson LLP

(57) ABSTRACT

Systems and procedures are presented for communicating multiple data streams through an SSLVPN gateway. One implementation of a method includes receiving a plurality of incoming data streams and load balancing the incoming data streams. The load balancing includes assigning a first set of one or more incoming data streams to a first subprocessor, and responding to the first set of incoming data streams with outgoing data streams that include a first identifier that indicates the first subprocessor. One implementation of a network element includes a plurality of subprocessors and a dispatcher module. The dispatcher module is coupled to the plurality of subprocessors, and is configured to recognize an identifier in a received data stream. The dispatcher module dispatches the received data stream to a corresponding subprocessor of the plurality of processors in response to the identifier in the received data stream.

29 Claims, 3 Drawing Sheets

(56) References Cited

U.S. PATENT DOCUMENTS

| | | | |
|---|---|---|---|
| 2006/0184647 A1* | 8/2006 | Dixit et al. | 709/219 |
| 2006/0259544 A1* | 11/2006 | Zubenko et al. | 709/203 |
| 2007/0150907 A1* | 6/2007 | Lee et al. | 719/330 |
| 2007/0239732 A1* | 10/2007 | Dixit et al. | 707/10 |

* cited by examiner

SCALABLE GATEWAY FOR MULTIPLE DATA STREAMS

BACKGROUND OF THE INVENTION

1. Field of the Invention

The present invention relates to data networks in general, and more particularly to the management of multiple data streams such as within virtual private networks using secure socket layer protection (SSLVPN).

2. Description of the Related Art

Virtual private networks (VPNs) are a tool for creating logically separate communications networks within existing communications networks. VPNs provide isolation from other data traffic that is communicated in tandem on the hardware and cabling in the existing communications network. Additionally, a VPN can be secured using cryptographic techniques, so that the data communicated on a user's VPN is protected from intrusion by other users on the existing communication network. Such protected VPNs have been helpful to users who wish to establish secure communications over public data networks such as the Internet. One technique for securing a VPN is the Secure Internet Protocol (IPSec). Another technique is to use the Secure Socket Layer protocol (SSL) to establish encryption-protected communications in a VPN. Such private networks are generally referred to as SSLVPNs. A host site may employ several servers, and may offer secure connectivity through SSLVPNs. In order to streamline the routing of incoming traffic, the servers may share a common gateway device that receives all incoming traffic and then forwards each incoming data stream to an appropriate server. The gateway may also be used to streamline the transmission of outgoing data streams. Using gateways in this manner can facilitate the use of a single address for the host site: client connecting to the various servers at a host site need to be apprised only of the address of the gateway device.

Various challenges exist in the implementation of SSLVPN gateways. For example, a host site generally hosts more than one SSLVPN session, with each SSLVPN session providing private protected communications with one or more remote users. At the gateway, incoming data is first decrypted, removing the SSL protection of the data. The unprotected data is then examined by the gateway to determine where it should be directed in the host site. Different data streams are directed to different local servers at the host site. Depending on the contents on information in the unprotected data, the host site then forwards the data to an appropriate local server for further processing.

The performance of an SSLVPN network can be degraded if the number of users or number of sessions becomes too large. If the amount of incoming and outgoing data exceeds the capacity of the gateway hardware to perform encryption, decryption, and internal directing, then the throughput of the SSLVPNs is reduced, affecting the performance of the system as seen by the users. It would be helpful to have techniques for efficiently addressing the needs of large numbers of users of a secure network. It would also be valuable to meet these needs without unnecessary duplication of gateway hardware and software.

SUMMARY OF THE INVENTION

Described herein are systems and procedures for communicating multiple data streams through an SSLVPN gateway. One implementation of a method includes receiving a plurality of incoming data streams and load balancing the incoming data streams. A main processor in the gateway distributes the data streams among a plurality of subprocessors to balance the resulting load on each of the processors. The load balancing includes assigning a first set of one or more incoming data streams from the plurality of incoming data streams to a first subprocessor, and responding to the first set of incoming data streams with outgoing data streams that include a first identifier that indicates the first processor.

Also described herein is a network element that includes a plurality of subprocessors and a dispatcher module. The dispatcher module is coupled to the plurality of subprocessors, and is configured to recognize an identifier in a received data stream. The dispatcher module dispatches the received data stream to a corresponding subprocessor of the plurality of processors in response to the identifier in the received data stream.

DETAILED DESCRIPTION

Figure 1:
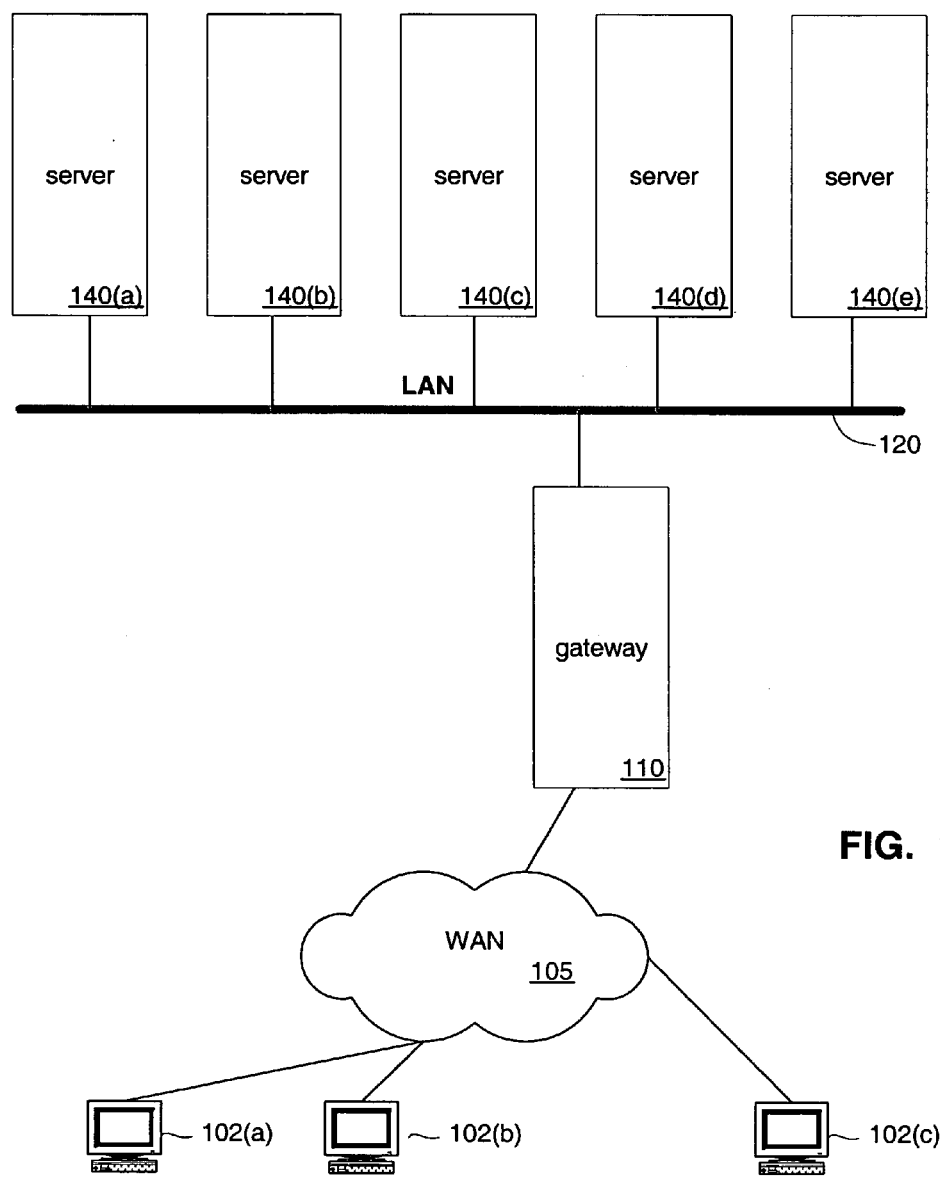
FIG. 1 is a block diagram of one implementation of a network on which virtual private networks are deployed.

FIG. 1 is a block diagram of one implementation of a network on which virtual private networks are deployed. The network includes several servers 140(*a-e*) (collectively, servers 140) at a host site. Servers 140 provides web-hosting services to various remote client computers 102(*a-c*) (collectively, clients 102). In other implementations, servers 140 may be email servers, database servers, or telnet servers, among others, or combinations thereof. Clients 102 are connected to a wide area network (WAN) such as the Internet 105. Servers 140 are connected to each other and to a gateway server 110 through a local area network (LAN) 120 or other internal network for the server facility. The gateway is a point of entry to the host site, and is also connected to the Internet 105. Clients 102 communicate with the servers through the Internet 105 and through gateway 110 and LAN 120.

In one configuration of a host site, users gain access to the services provided on servers 140 by connecting to the servers through clients 102. To secure the communications between clients 102 and servers 140, the connections between the clients and servers can be made as SSLVPN sessions through the Internet 105 to gateway 110, for example. Gateway 110 may receive all of the incoming data streams and forward each of the incoming data streams to the appropriate server 140(*a-e*). Although only one gateway is depicted in FIG. 1, it is contemplated that various environments employ one or more additional gateways (not shown) working in conjunction with gateway 110 to forward the incoming data streams to the appropriate servers.

In general, the forwarding of an incoming data stream requires some examination of the data streams. A data stream may include various URLs, such as URLs in the body of web pages that are communicated through the gateway 110. Some or all of these URLs may be communicated to and from the clients 102 in a "mangled" format that is different from a usual URL that holds plain addressing information. The mangled URLs may be employed for a variety of purposes. For example, these URLs may point to locations on host site's machines, such as severs 140 or other locations that are accessible through the LAN 120. Administrators of the host site may prefer that the clients 102 avoid using these regular URLs. For example, the administrators may wish to ensure that all traffic from the client computers is received through the gateway 110, rather than coming through other paths directly to the servers. In such situations, the gateway may be configured to transform any URLs in outbound data streams into an appropriately mangled format. For example, a local address of "http://www3.acme5computers.com/news" in an outbound data stream may be transformed into "https://gateway.acme5computers.com/http/www3.acme5computers.com/news". A client that responds to this address would then be directed to the gateway device ("https://gateway.acme5computers.com/"), which would then de-mangle the appended portion of the URL to recover the original address ("http://www3.acme5computers.com/news").

Similarly, administrators of a host site may wish to avoid divulging its internal network topology. Accordingly, a gateway at the host site may therefore communicate internal URLs in a mangled format that does not reveal in internal topology of the host site. In such a situation, a local address of "http://www3.acme5computers.com/news" in an outbound data stream may be transformed into a hashed format such as "http://gateway.acme5computers.com/zhyui76w". A malicious user at a client location would then be hampered from gaining much information about the internal structure of the host site, but could still use the mangled URLs to seek information from the host site via the gateway device. When the gateway device notices such mangled URLs in incoming data streams, it transforms them into the original local format for internal use at the host site.

When such communications occur through a VPN, this transforming is performed by the gateway after the data stream has been decrypted, so that the gateway has access to the unencrypted information. In general, the SSL protection or other security protocols are removed before the data stream can be transformed and examined. Thus, gateway 110 performs the dual functions of decrypting the incoming data streams and transforming the resulting decrypted data streams. The transforming requires a reading of the decrypted data and a processing of the data whenever a mangled URL (or other mangled information) is encountered in the incoming data stream. Based on information gleaned from the transforming, the gateway then forwards each incoming data stream to the appropriate server.

In the reverse direction, one configuration of the gateway is configured to insert appropriate identifiers or other mangled information into each outgoing data stream. The gateway then encrypts the outgoing data streams with SSL protection (or other encryption) and transmit the outgoing data streams to the appropriate clients 102(a-c) through the Internet 105.

Thus, gateway 110 is configured to perform two functions on incoming data streams. The gateway receives encrypted data streams and generates decrypted data streams therefrom. In addition, the gateway also transforms the decrypted incoming data streams so that they may be directed to appropriate servers and applications within the host site. The decryption involves procedures for removing SSL protection, such as terminating a TCP connection and unwrapping SSL data with appropriate public keys and session keys. The transforming of the unwrapped data generally involves a byte-by-byte examination of the decrypted data stream to recover any mangled URLs or other mangled address information, application information, or other mangled information, so that the data may be forwarded to an appropriate destination. The gateway 110 also performs the converse operations on outgoing data streams: mangling information as desired, and encrypting the resulting data stream.

The transforming of an incoming data stream generally depends on the decryption being performed first. Thus it is helpful to perform these functions in tandem. One implementation of a gateway 110 thus includes a processor that performs both decryption and transforming of the incoming data streams. The transforming and decryption are performed by one or more software modules running on a single processor.

Difficulties arise when the number of incoming data streams, or the volume of incoming data, exceeds the capacity of the processor in gateway 110. If the data streams are delayed while awaiting processing in gateway 110, the result is congestion on the VPNs being hosted by servers 140. This congestion is particularly unfortunate in situations where servers 140 are themselves not overloaded, and are awaiting data to be processed.

One approach to alleviating or preventing such congestion is to employ additional gateway servers to augment the capacity of gateway 110. Another approach is to equip gateways with a faster processor or with additional processors, each of which shares the tasks of decrypting and transforming the incoming data streams. These approaches may add substantially to the cost of the gateway (or gateways) used by a host site.

Yet another approach is to divide the tasks performed by gateway 110. Performance analyses of existing SSLVPN systems has revealed that the transforming function of the gateway is often be the bottleneck in the function of the gateway. That is, the transforming operations in the gateway often requires substantially more processing power than the decryption operations and related operations such as TCP termination. Thus, from a standpoint of economy of design, it would be helpful to dedicate additional hardware resources first to the task of transforming, rather than to other tasks performed by the gateway. This observation can help guide design considerations for gateway servers.

For example, it would be useful to employ multiple processors that share the gateway's transforming function, while only one (or a few) processors are used for decryption and other functions.

Figure 2:
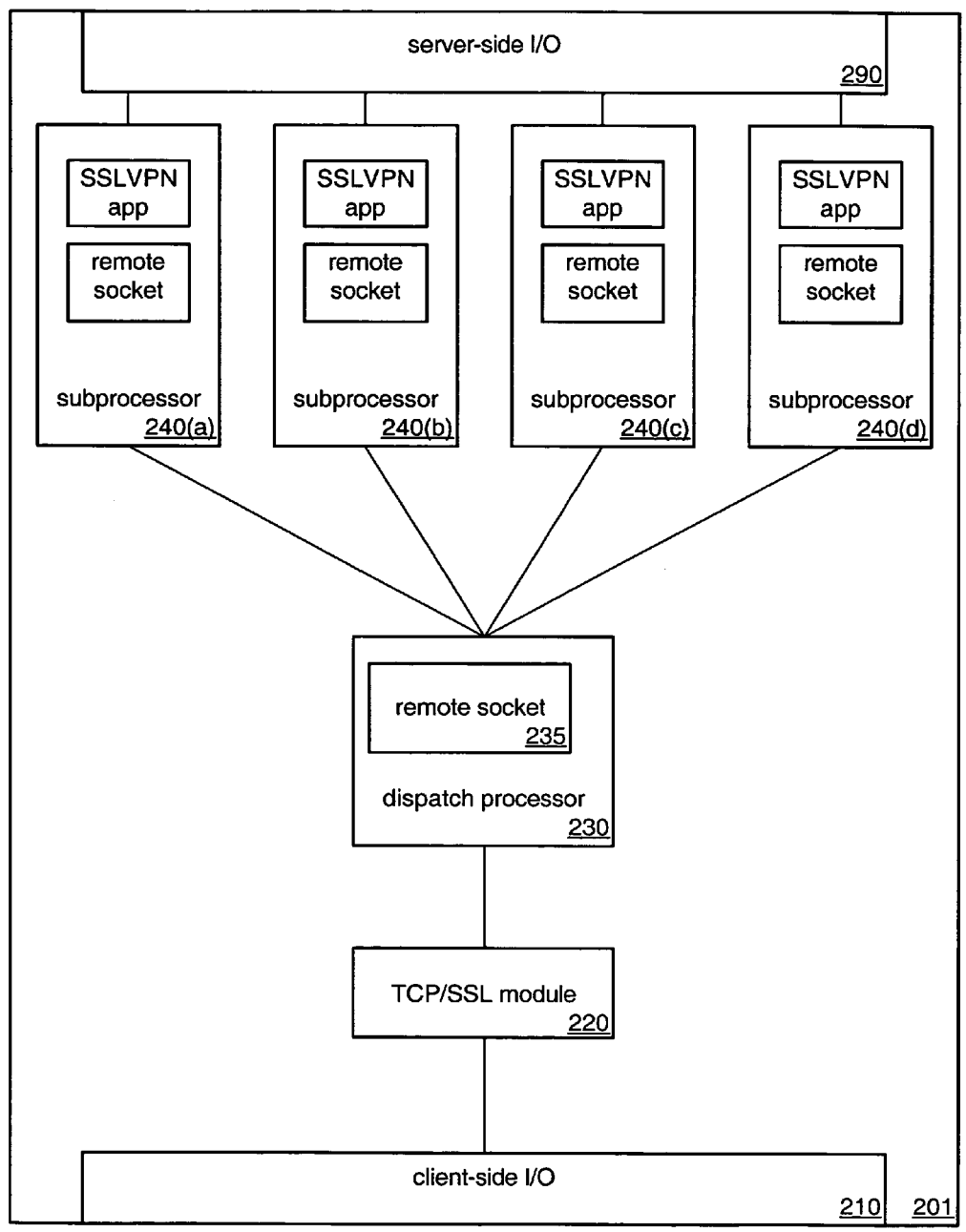
FIG. 2 is a block diagram of one implementation of a gateway server from FIG. 1.

FIG. 2 is a block diagram of one implementation of a gateway server 201. Gateway server 201 is used in the gateway server 110 from FIG. 1. Gateway server 201 includes several subprocessors 240(a-d) (collectively, subprocessors 240) that share the functions of transforming incoming data streams. The subprocessors may be separate processor units, or may be processor cores in one or more common packages, among other implementations. Gateway server 201 also includes a dispatch processor 230, a TCP/SSL module 220, a client-side input/output (I/O) interface 210, and a server-side input/output (I/O) interface 290. Dispatch processor 230 is coupled to subprocessors 240 and to TCP/SSL module 220. TCP/SSL module 220 is coupled to the client-side input/output (I/O) module 210. Server-side I/O interface 290 is coupled to the subprocessors 240.

Client-side I/O interface 210 receives incoming SSLVPN data from remote clients. The incoming data are provided to the TCP/SSL module, which performs decryption of the SSL-protected data. The resulting decrypted data are provided to dispatch processor 230. Dispatch processor 230 then examines the decrypted data to determine which of the several subprocessors 240(a-d) should be used for transforming the data. Dispatch processor 230 then dispatches the decrypted data to the appropriate subprocessor among subprocessors 240(a-d). Subprocessors 240(a-d) each transform their received data using software running on the subprocessors. Based on the transforming, subprocessors 240 determine the appropriate final destination for the data (such as one of the servers 140(*a-e*) from FIG. 1). Subprocessors 240 then forward the data to the appropriate destinations through the server-side I/O interface 290.

Dispatch processor 230 includes a remote socket module that facilitates communications with the subprocessors 240. Similarly, subprocessors 240 each include a remote socket module that facilitates communications with dispatch processor 230.

Dispatch processor 230 sends all the data from a given data stream to an assigned one of the subprocessors 240. Additionally, a given user might have different sessions open at the same time. Since there might be some common state for all the sessions, such as a session cookie, it can be helpful for all the sessions for a given user (or a given client computer) to be handled by a single one of subprocessors 240(*a-d*). Thus, in one implementation of a gateway, once an SSLVPN session is assigned to a subprocessor (or alternatively, once a remote client is assigned to a subprocessor), all the data from that session are sent to the same subprocessor. In order to enable this consistency, a subprocessor identifier is inserted into all communications in that session, so that further communications in that session can be readily identified as being assigned to the correct subprocessor.

For example, each subprocessor may handle one or several users (or SSLVPN sessions), but each user (or SSLVPN session) is assigned to a single subprocessor. In such an implementation, the subprocessor can then efficiently cache relevant information about the SSLVPN session, such as authentication and authorization information for the session. Such caching can be used to obviate the need for a user to repeatedly undergo challenge-and-response authentication procedures, as might be needed if the user's data stream is processed by more than one subprocessor. Similarly, the subprocessor may cache a user policy for each user. The user policy may be helpful to keep track of permissions for the user, such as determining what sites or information are permitted to the user (e.g., inventory database information from one server location) or not permitted to the user (e.g., financial database information from another server location).

With the division of functionality depicted in FIG. 2, performance can be scaled by running the processing-intensive applications (such as the transforming operations) on multiple subprocessors 240 and having dispatch processor 230 perform load balancing by dispatching different data streams to the different subprocessors 240(*a-d*).

The dispatch processor performs load balancing by assigning each data stream to a corresponding subprocessor based on the relative load on the various subprocessors. The dispatch processor thus acts as a master processor in the gateway, assigning work loads to the subprocessors that perform the subsequent transforming. When a user initially establishes an SSLVPN session with a host site, dispatch processor 230 assigns a subprocessor (depending on load) to the new SSLVPN session. Dispatch processor 230 then conveys all subsequent requests and connections through that SSLVPN to the same subprocessor.

Various techniques may be used to store the assigned association between an SSLVPN session and the assigned subprocessor. In one configuration, the assigned subprocessor is recorded in a HTTP cookie (or session cookie) on the client's browser and/or computer, and is included as a subprocessor ID tag in a session cookie that is included in each exchange of information between the gateway and the client. In another configuration, the assigned subprocessor ID tag is included in one or more of the mangled URLs in the data streams communicated between the gateway and the host. For example, the gateway may perform additional mangling to include the subprocessor ID: in such situations a URL of "http://www3.acme5computers.com/news" can be transmitted for example as "http://gateway.acme5computers.com/spid=3/http/www3.acme5computers.com/news". In this example, the embedded notation "spid=3" in an incoming data stream alerts dispatch processor 230 that the previously assigned subprocessor is subprocessor no. 3.

With the hardware assist provided by the multiple subprocessors 240, one (or a few) instances of a TCP/SSL stack can be freed to carry out additional TCP termination and decryption functions. These functions are carried out by one (or more) processors in TCP/SSL module 220.

Various approaches are contemplated for performing the load-balancing function of dispatch processor 230. In once configuration, dispatch processor 230 monitors the activity of the various subprocessors 220(*a-d*) and assigns new sessions to the least-loaded among the subprocessors. Additionally or instead, dispatch processor 230 reviews recent history of activity to identify the least-loaded subprocessor. Yet another, simpler, measure of processor loading is to consider the number of sessions active in a subprocessor, and to assign new data streams to the least-loaded subprocessor. It is contemplated that in some situations one or more of the subprocessors may be operating close to capacity or at capacity. To address such situations, one implementation of a gateway allows the highly burdened subprocessor to use a flow control mechanism to alert the dispatch processor 230 that an incoming data stream(s) need to be slowed for that subprocessor. The dispatch processor then uses TCP communications to contact the associated remote client(s) and request a temporary slowing of the data stream(s). Alternatively, or in addition, the dispatch processor is configured to reassign one or more data streams from the overloaded subprocessor to a less-loaded subprocessor.

Figure 3:
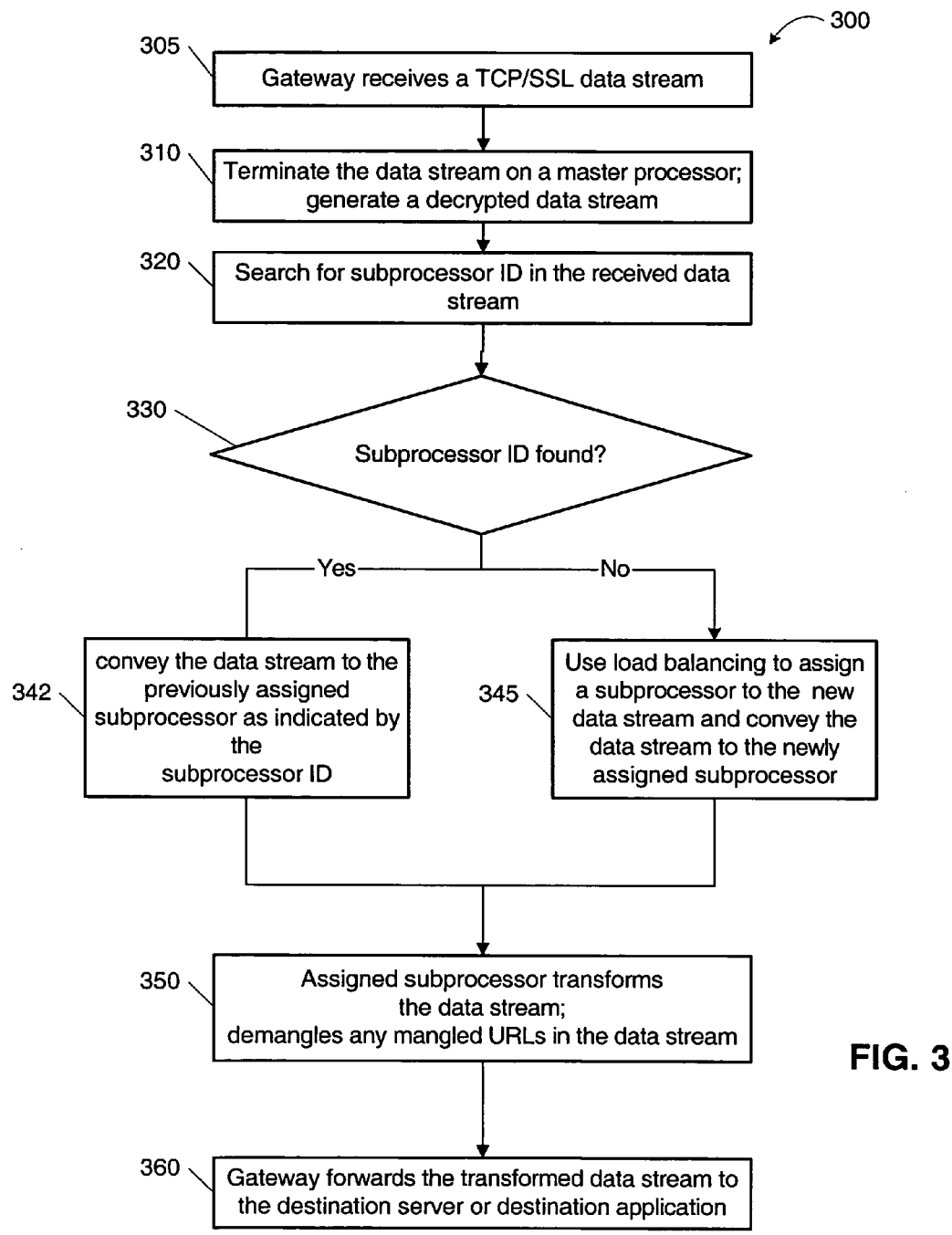
FIG. 3 is a flow diagram of one implementation of a procedure for balancing the work load of managing multiple private networks.

FIG. 3 is a flow diagram of one implementation of a procedure for balancing the work load of managing multiple private networks. The procedure begins in act 305, where a gateway server receives TCP/SSL data streams for SSLVPN sessions. In act 310, a master processor in the gateway terminates the TCP/SSL connection by managing the procedures for receiving TCP/SSL data streams. In particular, the master processor performs decryption of the SSL protection on the data streams to generate decrypted data streams. The decryption recovers decrypted data, which include mangled information such as mangled URLs and other mangled data.

In act 320, the master processor searches for an identifier that indicates which of the available subprocessors has been assigned to this data stream. In act 320 the session identifier is examined to determine if the session identifier indicates an assigned subprocessor for transforming the data stream. If an assigned subprocessor is found in the data stream in test 330, then in act 342 the data stream is conveyed to the indicated subprocessor. If no subprocessor is found in test 330, then the incoming data stream is understood to be a new data stream. Flow then proceeds to act 345, in which the master processor uses load balancing considerations to assign a subprocessor to the new data stream. The data stream is then conveyed to the newly assigned subprocessor.

In act 350, the assigned subprocessor transforms the data streams. The transforming includes restoring original URL and other mangled information from mangled URLs and other mangled information. Finally, in act 360, the gateway forwards the modified data stream to the destination server or destination application.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a plurality of incoming data streams at a gateway, wherein
      the gateway comprises a dispatch processor coupled to a plurality of sub-processors;
   load balancing the incoming data streams, wherein
      the load balancing is performed by the dispatch processor,
      the load balancing comprises
         assigning a first data stream of the incoming data streams to a first sub-processor of the plurality of sub-processors, and
         the assigning comprises
            identifying a first sub-processor identifier in the first data stream, wherein
               the first sub-processor identifier is associated with the first sub-processor, and
               the identifying is performed by the dispatch processor;
   transforming the first data stream of the incoming data streams, wherein
      the transforming the first data stream is performed by the first sub-processor, and
      the transforming the first data stream comprises converting a first mangled address in the first data stream into a standard address;
   forwarding the first data stream to a first server of a plurality of servers, wherein
      the forwarding is performed by the first sub-processor, in response to the transforming, and
      the first server corresponds to the standard address; and
   responding to the incoming data streams with a plurality of outgoing data streams, wherein
      each of the outgoing data streams comprises a sub-processor identifier,
      each of the sub-processor identifiers identifies a respective sub-processor of the plurality of sub-processors,
      each of the outgoing data streams comprises a respective mangled address,
      each of the mangled addresses comprises information identifying an address of a corresponding server among the plurality of servers,
      each of the plurality of servers is coupled to the gateway,
      each of the mangled addresses indicates an address of the gateway, and
      the first sub-processor is configured to generate the mangled addresses in the outgoing data streams.

2. The method of claim 1, wherein the sub-processor identifier comprises a session cookie in the outgoing data streams.

3. The method of claim 1, wherein the sub-processor identifier comprises information in a mangled address in the outgoing data streams.

4. The method of claim 1, wherein the sub-processor identifier comprises information in a mangled uniform resource locator (URL) address in the outgoing data streams.

5. The method of claim 1, wherein each one of the plurality of incoming data streams comprises data received from a corresponding remote application.

6. The method of claim 1, wherein each one of the plurality of incoming data streams comprises data received through a uniquely corresponding virtual private network (VPN).

7. The method of claim 1, further comprising:
   decrypting a first encrypted data stream of the first set of incoming data streams into a first decrypted data stream, wherein
      the decrypting is performed by a dispatch processor;
   detecting the sub-processor identifier in the first decrypted data stream; and
   dispatching the first decrypted data stream to the first sub-processor in response to the detecting the first identifier.

8. The method of claim 1,
   wherein the load balancing further comprises:
      assigning a second set of the one or more incoming data streams from the plurality of incoming data streams to a second sub-processor of the plurality of sub-processors; and
      responding to the second set of incoming data streams with outgoing data streams, wherein
         each of the outgoing data streams comprises a second identifier indicates the second sub-processor.

9. The method of claim 8, further comprising:
   decrypting a second encrypted data stream of the second set of incoming data streams into a second decrypted data stream;
   detecting the second identifier in the second decrypted data stream;
   dispatching the second decrypted data stream to the second sub-processor;
   transforming the second decrypted data stream to generate a second transformed data stream, wherein the transforming the second decrypted data stream is performed by the second sub-processor; and
   forwarding the second transformed data stream to a second server corresponding to the second transformed data stream.

10. The method of claim 9, wherein the first server comprises the second server.

11. The method of claim 7, wherein the detecting the sub-processor identifier comprises detecting the first identifier in a mangled address.

12. The method of claim 11, wherein the mangled address is a uniform resource locator (URL) in the first decrypted data stream.

13. A method comprising:
    receiving, at a gateway, a plurality of data streams, wherein
       the gateway comprises a dispatch processor coupled to a plurality of sub-processors;
    decrypting a first data stream and a second data stream of the data streams;
    load balancing the incoming data streams, wherein
       the load balancing is performed by the dispatch processor, and
       the load balancing comprises
          assigning the first data stream to a first sub-processor of the plurality of sub-processors, wherein
             the assigning comprises
                identifying a first sub-processor identifier in the first data stream, wherein
                   the first sub-processor identifier is associated with the first sub-processor, and
                   the identifying is performed by the dispatch processor;

assigning the second data stream to a second sub-processor of the plurality of sub-processors, wherein the second sub-processor is a sub-processor other than the first sub-processor;

transforming the first data stream, wherein
the transforming the first data stream is performed by the first sub-processor,
the transforming the first data stream comprises converting a first mangled address in the first data stream into a standard address,
the first data stream comprises a plurality of different mangled addresses,
each of the mangled addresses relates to an address of a corresponding node among a plurality of different nodes,
each of the plurality of different nodes is coupled to the gateway,
each of the mangled addresses indicates an address of the gateway, and
the first sub-processor is configured to convert the mangled addresses in the first data stream into a standard address;

forwarding the first data stream to a first server of a plurality of servers, wherein
the forwarding is performed by the first sub-processor, in response to the transforming, and
the first server corresponds to the standard address; and transforming the second data stream, wherein the transforming the second data stream is performed by the second sub-processor.

14. The method of claim 13, further comprising:
caching a first set of session information in support of the first sub-processor for the transforming the first data stream; and
caching a second set of session information in support of the second sub-processor for the transforming the second data stream.

15. The method of claim 14, wherein:
the first set of session information comprises a user information for a first user; and
the second set of session information comprises a user information for a second user.

16. The method of claim 14, wherein:
the first set of session information comprises a user policy for a first user; and
the second set of session information comprises a user policy for a second user.

17. The method of claim 13, wherein the transforming the second data stream comprises converting a mangled address in the second data stream into a standard address.

18. The method of claim 13, further comprising:
detecting a sub-processor identifier in the second data stream, wherein the sub-processor identifier is indicative of the second processor.

19. The method of claim 13, further comprising:
forwarding the second data stream to a second server after the transforming the second data stream.

20. The method of claim 19, wherein the first server comprises a server indicated in the first data stream, and the second server comprises a server indicated in the second data stream.

21. The method of claim 18, wherein the detecting the sub-processor identifier comprises detecting the sub-processor identifier in a mangled address within the first data stream, and the assigning the first data stream to the first sub-processor is performed using load-balancing considerations.

22. A hardware network element comprising:
a plurality of sub-processors; and
a dispatcher module coupled to the plurality of sub-processors, wherein
the dispatcher module is configured to load balance a plurality of incoming data streams,
the load balancing comprises
assigning a first data stream of the incoming data streams to a first sub-processor of the plurality of sub-processors,
the assigning comprises
identifying a first sub-processor identifier in the first data stream, wherein
the first sub-processor identifier is associated with the first sub-processor, and
the identifying is performed by the dispatch processor;
the first sub-processor is configured to transform the first data stream of the incoming data streams, wherein
transforming the first data stream comprises converting a first mangled address in the first data stream into a standard address;
the first sub-processor is configured to forward the first data stream to a first server of a plurality of servers in response to transforming the first data stream, wherein
the first server corresponds to the standard address,
the plurality of sub-processors are configured to respond to the incoming data streams with a plurality of outgoing data streams, wherein
each of the outgoing data streams comprises a sub-processor identifier,
each of the sub-processor identifiers identifies a respective sub-processor of the plurality of sub-processors,
each of the outgoing data streams comprises a respective mangled address,
each of the mangled addresses comprises information identifying an address of a corresponding server among the plurality of servers,
each of the plurality of servers is coupled to the network element,
each of the mangled addresses indicates an address of the network element, and
the first sub-processor is configured to generate the mangled addresses in the outgoing data streams.

23. The network element of claim 22, wherein each sub-processor in the plurality of sub-processors comprises:
a transformation module configured to transform addresses in the incoming data streams.

24. The network element of claim 23, wherein each sub-processor in the plurality of sub-processors further comprises:
a forwarding module coupled to the transformation module and configured to forward the incoming data streams to a corresponding server.

25. The network element of claim 23, further comprising:
a decryption module configured to decrypt an incoming encrypted stream into the first data stream.

26. The network element of claim 25, wherein the decryption module is configured to perform secure socket layer (SSL) decryption.

27. The network element of claim 23, wherein the dispatcher module comprises a dispatch processor, wherein the dispatch processor is a processor other than the plurality of processors and the dispatch module is executed on the dispatch processor.

28. The method of claim 1, wherein the responding comprises:
 receiving data comprising the first identifier in the incoming data streams through the gateway; and
 transmitting data in the outgoing data streams through the gateway.

29. The method of claim 1, wherein the first processor is configured to convert a plurality of mangled addresses in the first set of incoming data streams into standard addresses.

* * * * *

UNITED STATES PATENT AND TRADEMARK OFFICE
CERTIFICATE OF CORRECTION

PATENT NO. : 8,639,842 B1  
APPLICATION NO. : 11/479981  
DATED : January 28, 2014  
INVENTOR(S) : Nagaraj A. Bagepalli et al.

Page 1 of 1

It is certified that error appears in the above-identified patent and that said Letters Patent is hereby corrected as shown below:

In the claims

Column 8
Line 5, in Claim 7, replace: "the first set" by -- a first set --
Line 12, in Claim 7, insert: -- sub-processor -- immediately after "detecting the first"
Line 15, in Claim 8, replace: "of the one" by -- of one --
Line 20, in Claim 8, insert: -- the one of more -- immediately after "second set of"
Line 26, in Claim 9, insert: -- the one of more -- immediately after "set of"
Line 43, in Claim 11, insert: -- sub-processor -- immediately after "detecting the first"

Column 9
Line 55, in Claim 18, replace: "second processor" by -- second sub-processor --

Column 10
Lines 17-18, in Claim 22, replace: "dispatch pro-cessor" by -- dispatcher module --
Line 41, in Claim 22, replace: "the network" by -- the hardware network --
Line 44, in Claim 22, replace: "the network" by -- the hardware network --
Line 47, in Claim 23, replace: "The network" by -- The hardware network --
Line 51, in Claim 24, replace: "The network" by -- The hardware network --
Line 57, in Claim 25, replace: "The network" by -- The hardware network --
Line 60, in Claim 26, replace: "The network" by -- The hardware network --
Line 63, in Claim 27, replace: "The network" by -- The hardware network --
Line 66, in Claim 27, replace: "processors" by -- sub-processors --
Line 66, in Claim 27, replace: "dispatch module" by -- dispatcher module --

Column 11
Line 3, in Claim 28, insert: -- sub-processor -- immediately after "comprising the first"
Line 7, in Claim 29, replace: "first processor" by -- first sub-processor --
Line 8, in Claim 29, replace: "addresses in the" by -- addresses in a --

Signed and Sealed this
Nineteenth Day of April, 2016

Michelle K. Lee
*Director of the United States Patent and Trademark Office*